(12) United States Patent
Wang et al.

(10) Patent No.: US 11,016,263 B2
(45) Date of Patent: May 25, 2021

(54) LENS DRIVE MOTOR, CAMERA AND MOBILE TERMINAL APPARATUS

(71) Applicant: Shanghai Billu Electronics Co., Ltd., Shanghai (CN)

(72) Inventors: Jianhua Wang, Shanghai (CN); Gaofeng Gong, Shanghai (CN); Lixin Tang, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 243 days.

(21) Appl. No.: 16/180,035

(22) Filed: Nov. 5, 2018

(65) Prior Publication Data

US 2020/0012070 A1 Jan. 9, 2020

(30) Foreign Application Priority Data

Jul. 4, 2018 (CN) .......................... 201810726083.0

(51) Int. Cl.
*G02B 7/04* (2021.01)
*G02B 7/02* (2021.01)
(Continued)

(52) U.S. Cl.
CPC .............. *G02B 7/04* (2013.01); *G02B 7/026* (2013.01); *G03B 13/34* (2013.01); *G03B 17/12* (2013.01); *G03B 2205/0069* (2013.01)

(58) Field of Classification Search
CPC ........ A61B 17/00234; A61B 17/00491; A61B 17/0401; A61B 17/0487; A61B 17/0644; A61B 17/068; A61B 17/08; A61B 17/083; A61B 17/29; A61B 17/295; A61B 2017/00243; A61B 2017/00477;
(Continued)

(56) References Cited

U.S. PATENT DOCUMENTS 3,465,361 A * 9/1969 Lode ..................... H01Q 15/02
343/911 R
2006/0245085 A1 11/2006 Lee et al.
2008/0198254 A1 * 8/2008 Nagasaki ................ G03B 3/10
348/335

FOREIGN PATENT DOCUMENTS

KR 101093738 B1 12/2011
KR 20150081109 A * 7/2015
(Continued)

OTHER PUBLICATIONS

Supplemental EP Search Report dated May 29, 2019 re: Application No. 18204406.5, pp. 1-8, citing: KR101093738B1; KR20150081109A; US2006245085A1 and WO2018086407A1.

*Primary Examiner* — Joseph P Martinez
*Assistant Examiner* — Vipin Patel
(74) *Attorney, Agent, or Firm* — Gang Yu (57) ABSTRACT

Provided are a lens drive motor, a camera and a mobile terminal apparatus. The lens drive motor includes a housing, a lens support, a coil and a magnet component; the coil is wrapped around the lens support and is provided in the housing; the magnet component is provided between the housing and the lens support, wherein a portion, corresponding to the magnet component, of the housing is made of a first material, and other portions of the housing are made of a second material; and a magnetic conductivity of the second material is smaller than a magnetic conductivity of the first material. A problem of insufficient driving force of the lens drive motor in a related technology is solved by the present disclosure.

17 Claims, 5 Drawing Sheets

(51) Int. Cl.
*G03B 13/34* (2021.01)
*G03B 17/12* (2021.01)

(58) Field of Classification Search
CPC .......... A61B 2017/00783; A61B 2017/00867; A61B 2017/00876; A61B 2017/0409; A61B 2017/0412; A61B 2017/0414; A61B 2017/0417; A61B 2017/0419; A61B 2017/0427; A61B 2017/0435; A61B 2017/0441; A61B 2017/0445; A61B 2017/0454; A61B 2017/0464; A61B 2017/048; A61B 2017/0496; A61B 2017/0647; A61B 2017/12018; A61B 2017/22044; A61F 2002/249; A61F 2002/30079; A61F 2210/009; A61F 2220/0016; A61F 2250/0003; A61F 2/2412; A61F 2/2445; A61F 2/2454; A61F 2/2457; A61F 2/246; A61F 2/2463; A61F 2/2487; G02B 7/026; G02B 7/04; G02B 7/08; G03B 13/34; G03B 17/12; G03B 2205/0069; H02K 11/215; H02K 1/17; H02K 2213/03; H02K 3/46; H02K 41/0356; H02K 5/02

See application file for complete search history.

(56) References Cited

FOREIGN PATENT DOCUMENTS

| | | |
|---|---|---|
| KR | 20150081109 A | 7/2015 |
| WO | 2018086407 A1 | 5/2018 |

\* cited by examiner

LENS DRIVE MOTOR, CAMERA AND MOBILE TERMINAL APPARATUS

TECHNICAL FIELD

The present disclosure relates to the technical field of photographic equipment, and more particularly, to a lens drive motor, a camera and a mobile terminal apparatus.

BACKGROUND

Since a mobile terminal apparatus such as a mobile phone universally requires a light and thin structure, in order to miniaturize the mobile terminal apparatus, a motor is usually designed to be thin. Moreover, a housing made of Steel Use Stainless is generally adopted. Due to relatively low magnetic conductivity of the Steel Use Stainless housing, a problem of flux leakage is occurred easily and thus a lens drive motor has a problem of insufficient driving force.

SUMMARY

Some embodiments of the present disclosure provide a lens drive motor, a camera and a mobile terminal apparatus, so as to solve a problem of insufficient driving force of the lens drive motor in a related technology.

To this end, according to an embodiment of the present disclosure, there is provided a lens drive motor, which includes: a housing, a lens support, a coil and a magnet component; the coil is wrapped around the lens support and is provided in the housing; the magnet component is provided between the housing and the lens support, wherein a portion, corresponding to the magnet component, of the housing is made of a first material, and other portions of the housing are made of a second material; and a magnetic conductivity of the second material is smaller than a magnetic conductivity of the first material.

In an exemplary embodiment, the first material and the second material are fixed by welding.

In an exemplary embodiment, the first material is a Steel Plate Cold rolled Commercial (SPCC) material; and/or the second material is a Steel Use Stainless (SUS) material.

In an exemplary embodiment, a portion, corresponding to the magnet component, of a peripheral wall of the housing is made of the first material.

In an exemplary embodiment, the magnet component includes multiple sub-magnets provided in pairs; and two sub-magnets of each pair of the multiple sub-magnets are respectively positioned at two sides of the lens support and are at least corresponding to straight edges of the housing.

In an exemplary embodiment, each of the multiple sub-magnets is of a bent type structure; each of the multiple sub-magnets includes a main body segment and an extending segment connected sequentially; an included angle is formed between the extending segment and the main body segment; multiple straight edge segments and multiple corner segments connecting the multiple straight edge segments are included at a outer periphery of the lens support; the main body segment cover corresponding one straight edge segment of the multiple straight edge segments; and the extending segment stretch out to one of the corner segments.

In an exemplary embodiment, multiple straight edge segments and multiple corner segments connecting the multiple straight edge segments are included at a outer periphery of the lens support; at least one of the multiple corner segments is provided with a wrapping post; the magnet component is provided in avoidance of the wrapping post; and end portions of the coil are fixed on the wrapping post.

In an exemplary embodiment, the multiple corner segments are four corner segments, and there are two wrapping posts; and the two wrapping posts are respectively provided on two corner segments symmetrical to each other.

In an exemplary embodiment, the lens support is provided with a wire wrapping area; a plurality of limiting ridges for stopping the coil are provided in the wire wrapping area; a plurality of anti-impact ridges are further provided in the wire wrapping area; and the coil is wrapped in the wire wrapping area to cover the anti-impact ridges.

In an exemplary embodiment, a thickness H1 of a corner portion of a peripheral wall of the housing is greater than a thickness H2 of other portions of the peripheral wall of the housing.

In an exemplary embodiment, a ratio of the thickness H2 to the thickness H1 is greater than 0.6 and is less than 1.

In an exemplary embodiment, the thickness H1 is greater than or equal to 0.2 mm and is smaller than or equal to 0.25 mm.

In an exemplary embodiment, the thickness H1 is equal to 0.2 mm.

In an exemplary embodiment, the thickness H2 is greater than or equal to 0.15 mm and is smaller than or equal to 0.2 mm.

In an exemplary embodiment, the thickness H2 is equal to 0.15 mm.

According to another embodiment of the present disclosure, there is provided a camera, which includes the above-mentioned lens drive motor.

According to another embodiment of the present disclosure, there is provided a mobile terminal apparatus, which includes the above-mentioned camera.

In an exemplary embodiment, the mobile terminal apparatus includes at least one of a mobile phone, an information carrying terminal and a notebook computer.

By applying the technical solutions of the present disclosure, the lens drive motor includes a housing, a lens support, a coil and a magnet component; the coil is wrapped around the lens support and is provided in the housing; the magnet component is provided between the housing and the lens support, wherein a portion, corresponding to the magnet component, of the housing is made of a first material, and other portions of the housing are made of a second material; and a magnetic conductivity of the second material is smaller than a magnetic conductivity of the first material.

In this way, due to an action of the magnet component and the coil, an electromagnetic induction is generated to drive the lens support to move. Since the portion corresponding to the magnet component is the first material which has better magnetic conductivity, a flux leakage paths may be reduced, the flux leakage is reduced, a relatively strong magnetic field intensity is guaranteed and the motor is guaranteed to have sufficient driving force; a relatively large driving force can be generated under an action of a very small current, and an energy consumption is reduced; in addition, since the magnetic field intensity is effectively improved, a magnetic field component may be designed to be lighter and thinner, and thus a lens drive motor which is lighter and thinner can be designed and an aesthetics is improved; and besides, a compressive strength of the second material is greater than that of the first material, so on a premise of guaranteeing the magnetic field intensity, the compressive strength of the lens drive motor is increased and the very good protective effect is taken on the lens drive motor.

BRIEF DESCRIPTION OF THE DRAWINGS

The accompanying drawings are described here to provide further understanding of the present disclosure, and form a part of the present disclosure. The schematic embodiments and description of the present disclosure are adopted to explain the present disclosure, and do not form improper limits to the present disclosure. In the drawings.

NUMERALS IN THE ACCOMPANYING DRAWINGS

10. a housing; 11. a corner portion; 12. a first material; 13. a second material; 20. a lens support; 21. a straight edge segment; 22. a corner segment; 23. a wrapping post; 25. a limiting ridge; 30. a coil; 40. a magnet component; 50. an upper spring; 60. a lower spring; 61. a positioning hole; 70. a pedestal; 71. a central avoidance opening; 72. a dustproof ring; 82. a projection portion; 90. a PCB; and 100. a hall chip.

DETAILED DESCRIPTION OF THE EMBODIMENTS

It is to be noted that the embodiments of the present application and the characteristics of the embodiments may be combined with each other if there is no conflict. The present disclosure will be described below with reference to the drawings and embodiments in detail.

It is to be noted that, unless otherwise specified, all technical and scientific terms used herein have the same meanings with those generally understood by those of ordinary skill in the art.

In the present disclosure, under the condition of not giving a reverse description, localizers such as "upper, lower, top and bottom" generally refer to directions shown in the accompanying drawings, or components in itself are on vertical, perpendicular or gravity direction. Likewise, to understood and describe conveniently, "inner and outer" refer to be inside and outside of an intrinsic outline of each component. However, the above localizers are not used to limit the present disclosure.

In order to solve a problem of insufficient driving force of a lens drive motor in a related technology, some embodiments of the present disclosure provide a lens drive motor, a camera and a mobile terminal apparatus. Wherein, the camera is provided with the following lens drive motor, and the mobile terminal apparatus is provided with the camera.

Optionally, the mobile terminal apparatus includes at least one of a mobile phone, an information carrying terminal and a notebook computer.

As shown in FIG. 1 to FIG. 7, the lens drive motor includes a housing 10, a lens support 20, a coil 30 and a magnet component 40; the coil 30 is wrapped around the lens support 20 and is provided in the housing 10; the magnet component 40 is provided between the housing 10 and the lens support 20, wherein a portion, corresponding to the magnet component 40, of the housing 10 is made of a first material 12, and other portions of the housing 10 are made of a second material 13; and a magnetic conductivity of the second material 13 is smaller than a magnetic conductivity of the first material 12.

In this way, due to an action of the magnet component 40 and the coil 30, an electromagnetic induction is generated to drive the lens support 20 to move. Since the portion corresponding to the magnet component 40 is the first material 12 which has better magnetic conductivity, a flux leakage paths may be reduced, the flux leakage is reduced, a relatively strong magnetic field intensity is guaranteed and the motor is guaranteed to have sufficient driving force; a relatively large driving force can be generated under the action of a very small current, and an energy consumption is reduced; in addition, since the magnetic field intensity is effectively improved, a magnetic field component may be designed to be lighter and thinner, and thus a lens drive motor which is lighter and thinner can be designed and an aesthetics is improved; and besides, a compressive strength of the second material 13 is greater than that of the first material 12, so on a premise of guaranteeing the magnetic field intensity, the compressive strength of the lens drive motor is increased and the very good protective effect is taken on the lens drive motor.

Figure 1:
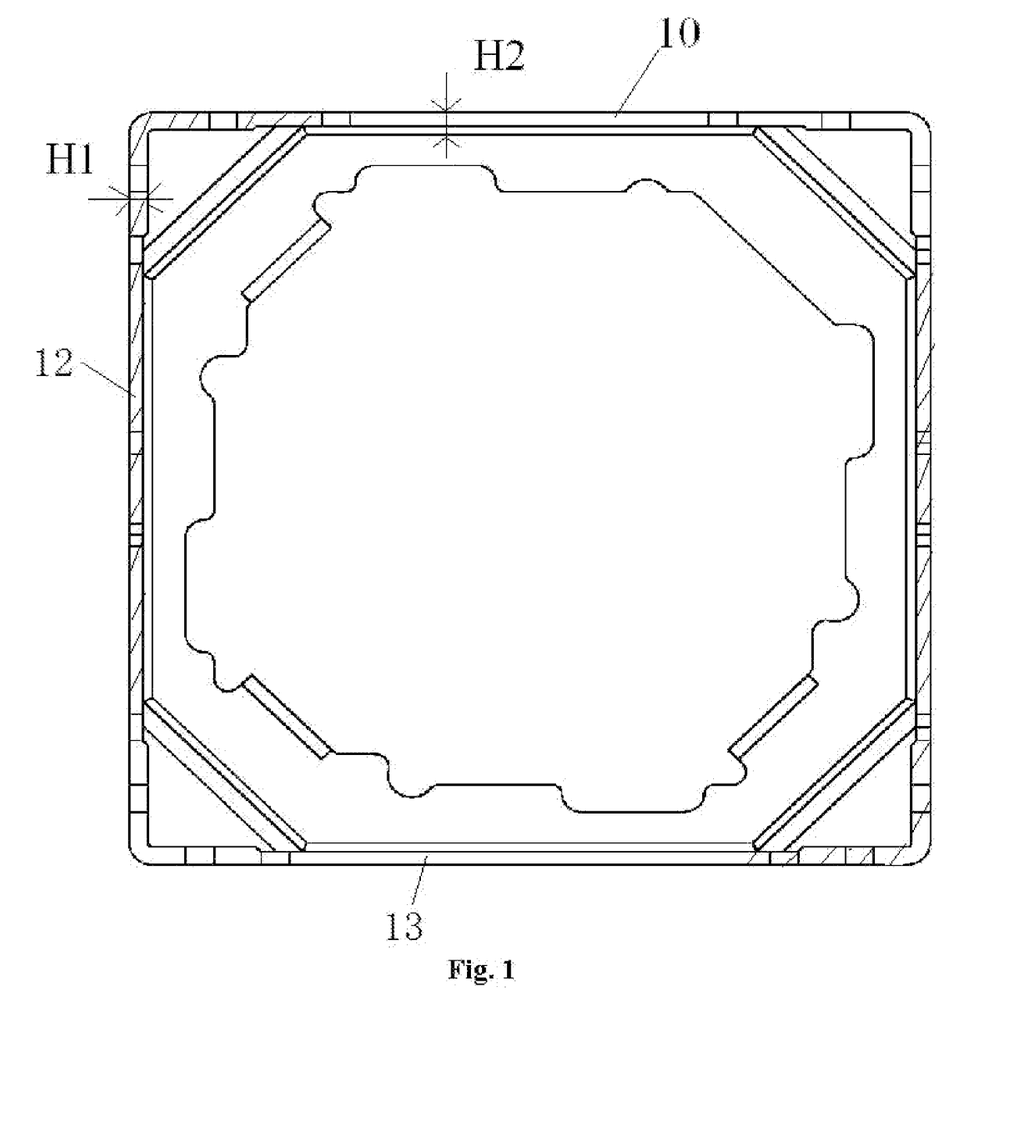
FIG. 1 shows a structural schematic diagram of a housing in an optional embodiment of the present disclosure.

In the present embodiment, the first material 12 and the second material 13 are fixed by welding. By employing a welding manner, the operation is simple and practical, the implementation is convenient, the connection is firm, the stability and the reliability are high, and the cost is relatively low.

Optionally, the first material 12 is an SPCC material; and/or the second material 13 is an SUS material. The SPCC material has good magnetic conductivity, so the flux leakage paths may be reduced, the flux leakage is reduced, the static electricity may be prevented, the very good protective effect is taken on the magnet component 40, the magnetic field intensity between the magnet component 40 and the coil 30 is improved, the driving force of the motor is increased and the cost is relative low. As the SUS material has relatively high strength, the impact resistance is relatively strong, the stability is good and it can take the very good protective effect to the lens drive motor.

It is to be noted that, during assembly, the materials are placed according to left and right arrangements in a sequence of SPCC material+SUS material+SPCC material and welded, then are processed via a calendaring technique and at last are machined into a required form. Under the same conditions, when the SPCC material is adopted, the mutual repulsive force of the motor is greatly reduced, so that the motor is better applied to a double camera.

After the materials are processed via the calendaring technique, a welding groove is well machined and repaired. Therefore, different materials are combined very effectively.

Seemingly, the welding groove is also very smooth and it is difficult to distinguish that the welding groove is a combination of the two materials.

In the present embodiment, a portion, corresponding to the magnet component 40, of a peripheral wall of the housing 10 is made of the first material 12. The magnetic conductivity of the first material 12 is better than that of the second material 13 and the first material 12 is arranged corresponding to the magnet component 40, so the flux leakage paths may be reduced, the leakage of the magnetic field can be effectively avoided and the relatively strong magnetic field intensity is guaranteed; and thus, the motor is guaranteed to have the sufficient driving force, a relatively large driving force can be generated under the action of a very small current, and the energy consumption is reduced; in addition, since the magnetic field intensity is effectively improved, a magnetic field component may be designed to be lighter and thinner, and thus a lens drive motor which is lighter and thinner can be designed and the aesthetics is improved.

Figure 2:
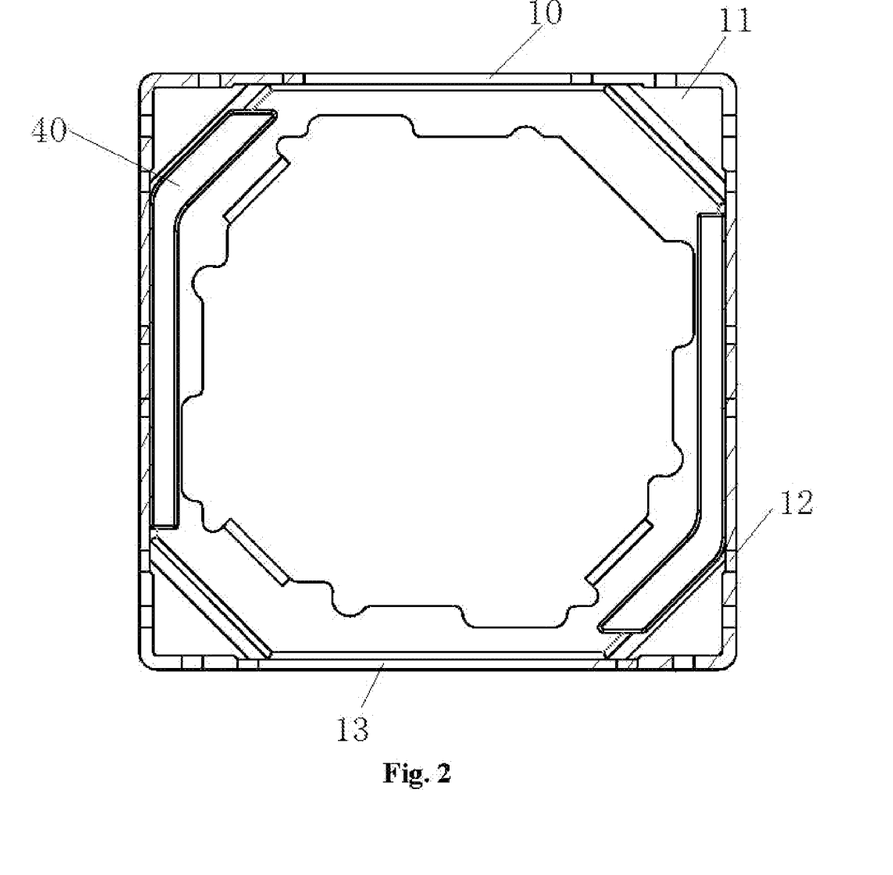
FIG. 2 shows a schematic diagram of a positional relationship between a housing and a magnet component in the present embodiment.

As shown in FIG. 2, the magnet component 40 includes multiple sub-magnets provided in pairs; and two sub-magnets of each pair of the multiple sub-magnets are respectively positioned at two sides of the lens support 20 and are at least corresponding to straight edges of the housing 10.

In the present embodiment, the lens drive motor further includes upper spring 50 positioned above the lens support 20, and lower spring 60 positioned below the lens support 20; two sub-magnets of each pair are formed into 180° one another and are arranged oppositely. After a current is charged to the coil 30, an electromagnetic force is generated between the coil 30 and the magnet component 40. According to the Flemming's left-hand rule, due to the action of the electromagnetic force, the lens support 20 is driven to move linearly along an optical axis direction of the lens, and the lens support 20 is finally stayed at a position where the electromagnetic force between the coil 30 and the magnet is in a balanced state with the resultant force of elastic forces of the upper spring 50 and the lower spring 60. By charging a given current to the coil 30, the lens support 20 can be controlled to move to a target position, thus achieving the focusing purpose.

As shown in FIG. 2, each of the multiple sub-magnets is of a bent type structure; each of the multiple sub-magnets includes a main body segment and an extending segment connected sequentially; an included angle is formed between the extending segment and the main body segment; multiple straight edge segments 21 and multiple corner segments 22 connecting the multiple straight edge segments 21 are included at a outer periphery of the lens support 20; the main body segment cover corresponding one straight edge segment of the multiple straight edge segments 21; and the extending segment stretch out to one of the corner segments 22. Since the main body segment cover corresponding one straight edge segment of the multiple straight edge segments 21; and the extending segment stretch out to one of the corner segments 22, each of the multiple sub-magnets can be cooperated with the coil 30 at the straight edge segments 21 and multiple corner segments 22, the effective action area between the magnet component 40 and the coil 30 is increased, the magnetic field intensity is improved and thus the driving force of the motor is increased. Wherein, the included angle between the extending segment and the main body segment is provided in cooperation with one of included angles between the straight edge segments 21 and the corner segments 22, so that the magnet component 40 and the lens support 20 are protected better.

Figure 3:
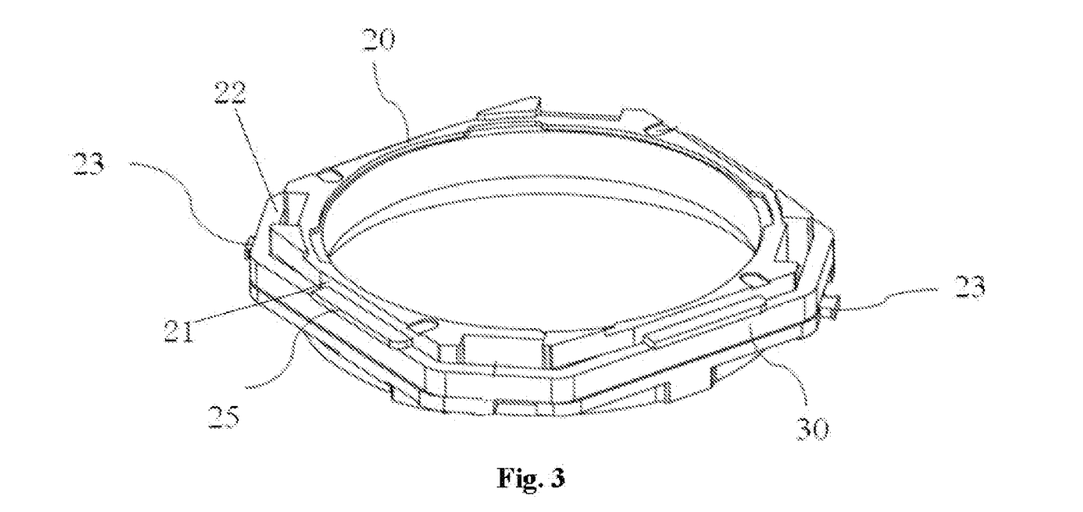
FIG. 3 is a schematic diagram of a connection relationship between a coil and a lens support in the present embodiment.

As shown in FIG. 3, the multiple straight edge segments 21 and the multiple corner segments 22 connecting the multiple straight edge segments 21 are included at a outer periphery of the lens support 20; at least one of the multiple corner segments 22 is provided with a wrapping post 23; the magnet component 40 is provided in avoidance of the wrapping post 23; and end portions of the coil 30 are fixed on the wrapping post 23.

In a specific embodiment shown in FIG. 3, the multiple corner segments 22 are four corner segments 22, and there are two wrapping posts 23; and the two wrapping posts 23 are respectively provided on two corner segments 22 symmetrical to each other.

As shown in FIG. 3, the lens support 20 is provided with a wire wrapping area; a plurality of limiting ridges 25 for stopping the coil 30 are provided in the wire wrapping area; a plurality of anti-impact ridges are further provided in the wire wrapping area; and the coil 30 is wrapped in the wire wrapping area to cover the anti-impact ridges. As the limiting ridges 25 is provided, a very good limiting and protecting effect can be taken on the coil 30. In addition, with the anti-impact ridge 26, the impact resistance between the wrapped coil 30 and the lens support 20 will be greatly enhanced; and therefore, even under the action of an external force, the coil 30 also will not be dropped from the lens support 20 and thus the reliability of the lens drive motor is improved.

As shown in FIG. 1, a thickness H1 of a corner portion 11 of a peripheral wall of the housing 10 is greater than a thickness H2 of other portions of the peripheral wall of the housing 10. In this way, the better protective effect can be taken on the magnet component 40, the leakage of the magnetic field can be effectively avoided and the relatively strong magnetic field intensity is guaranteed; and thus, the motor is guaranteed to have the sufficient driving force and a relatively large driving force can be generated under the action of a very small current, thereby reducing the energy consumption.

In an exemplary embodiment, a ratio of the thickness H2 to the thickness H1 is greater than 0.6 and is less than 1. In such a manner, the housing 10 is guaranteed to have the relatively good intensity, the very good protective effect can be taken on the magnet component 40 and the leakage of the magnetic field is prevented; and meanwhile, the lens drive motor is guaranteed to have the light and thin characteristics.

In an exemplary embodiment, the thickness H1 is greater than or equal to 0.2 mm and is smaller than or equal to 0.25 mm. In this way, the better protective effect can be taken on the magnet component 40, the leakage of the magnetic field can be effectively avoided and the relatively strong magnetic field intensity is guaranteed; and thus, the motor is guaranteed to have the sufficient driving force and a relatively large driving force can be generated under the action of a very small current, thereby reducing the energy consumption.

It is to be noted that, with the utilization of structural characteristics of the motor and on the premise of not affecting the overall structural dimension of the motor, the thickness H1 of the corner portion of the peripheral wall of the housing 10 may further be improved. Increasing the thickness H1 is the most direct and obvious to enhance the flux leakage resistance of the motor and further accelerate the push effect of the motor. And meanwhile, the design requirement on lighting and thinning also can be met.

In an exemplary embodiment, the thickness H1 is equal to 0.2 mm. In such a manner, the housing 10 can be guaranteed to take the best protective effect on the magnet component 40, the flux leakage resistance is the best and the magnetic field intensity is the best.

In an exemplary embodiment, the thickness H2 is greater than or equal to 0.15 mm and is smaller than or equal to 0.2 mm. In this way, on the premise of meeting the use requirements, the thickness and the weight of the housing 10 are guaranteed to be in a relatively small range, the size of the housing 10 is reduced and thus the lens drive motor is relatively light and thin.

It is to be noted that, it is relatively difficult to change or increase the thickness H2 within a given compact and limited space range of the motor, and the involved influence range is relatively large. In order to obtain the relatively good flux leakage resistance, once the thickness H2 is changed, the sizes of all relevant components inside the housing 10 will be correspondingly adjusted and changed and the cost for such change is relatively high. Since the sizes of the coil 30 and the magnet component 40 are shrunken and are changed, the comprehensive result is unnecessarily in favor of improving the overall performance including the thrust performance of the motor and implementing standardization of motor products. On the basis of existing functional structures, the most reasonable and feasible way is to keep the thickness H2 unchanged and increase the thickness H1. Of course, on the basis of meeting various functions, it is also appropriate to enable the thickness H1 and the thickness H2 to be the same. The present embodiment is a technical improvement made for the purpose of improving the functions of the motor, and the thrust performance will be greatly improved compared with that ever before.

In an exemplary embodiment, the thickness H2 is equal to 0.15 mm. In this way, on the premise of meeting the use requirement, the thickness and the weight of the housing 10 can be guaranteed to be in an optimal range and the size of the housing 10 is reduced; and thus, the lighting and thinning degrees of the lens drive motor are optimal and the aesthetics is improved.

It is to be noted that, the thicker the housing 10 corresponding to the magnet component 40, the less magnetic force lines, and thus the adverse condition of the flux leakage can be more effectively prohibited. That is, under the condition of a same current, the higher the magnetic field intensity generated by the magnet component 40, the more obvious on improvement of the driving force of the motor. By improving the driving force, a lens with a relatively large weight can be carried and driven, a high-pixel lens drive motor is provided and the structural design on low current and miniaturization of the lens drive motor is implemented. To select the material of the housing 10, the selected thickness is 0.2 mm, a thickness H1 of the portion, corresponding to the magnet component 40, on the peripheral wall of the housing 10 is changed into 0.2 mm or more and the thickness of the housing 10 on other portions is machined into 0.15 mm; the specific implementation manner is as follows: a 0.2 mm material strap is extruded via a mould by the housing 10 manufacturer into the thicknesses such as 0.15 mm. Therefore, compared with the former driving force, 25% driving force may be improved.

In the present embodiment, the lens drive motor further includes upper springs 50 positioned above the lens support 20, and lower spring 60 positioned below the lens support 20; and a plurality of glue holes are formed at a plurality of vortex angles of the upper spring 50. The upper spring 50 is configured to support an upper end surface of the lens support 20 and the lower spring 60 is configured to support a lower end surface of the lens support 20. Since the glue holes are formed at a plurality of vortex angles of the upper spring 50, the upper spring 50 and the lens support 20 can be fixedly connected via a manner of injecting a glue to improve the anti-impact capacity of the lens drive motor and improve the stability. Moreover, by injecting the glue into the glue holes, the spillover can be prevented from affecting the performance of other structures.

Figure 5:
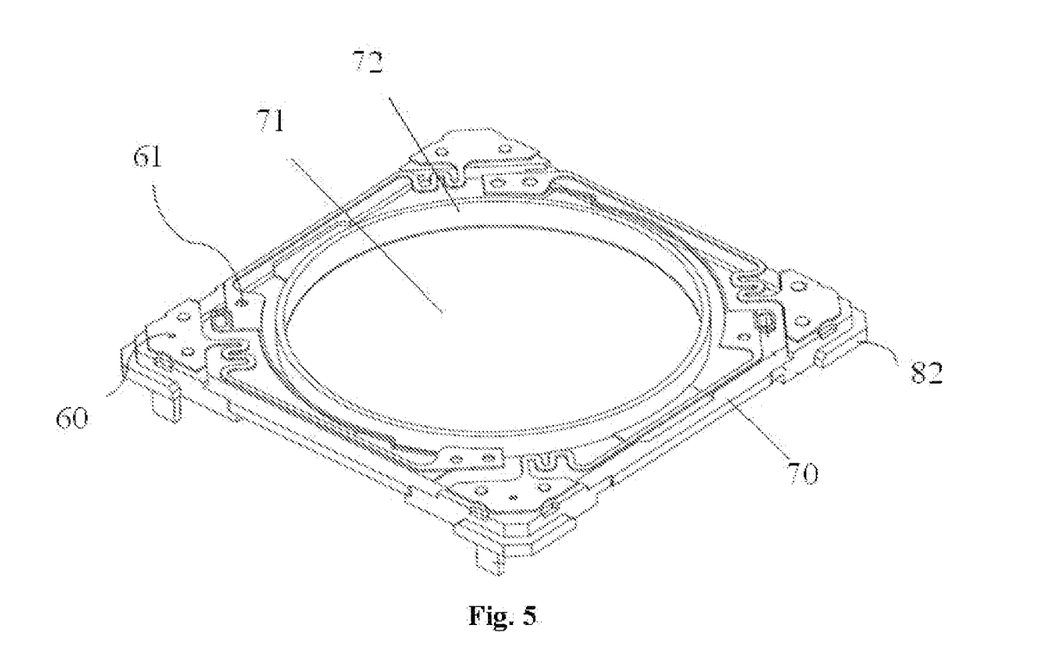
FIG. 5 is a schematic diagram of a connection relationship between a lower spring and a pedestal in the present embodiment.
Figure 6:
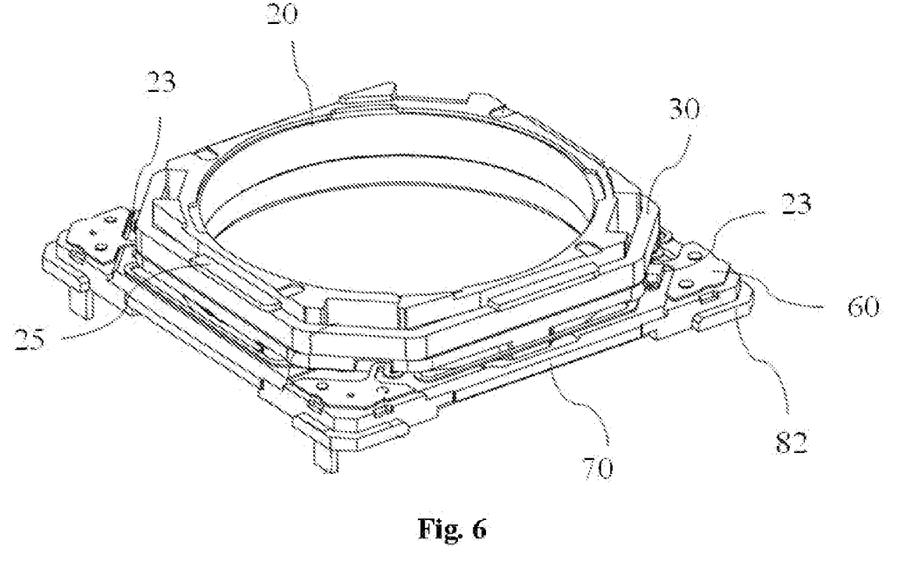
FIG. 6 is a schematic diagram of a connection relationship among a pedestal, a lower spring and a lens support in the present embodiment.

As shown in FIG. 5 and FIG. 6, the lens drive motor further includes a pedestal 70; the housing 10 is arranged on the pedestal 70 to form a accommodating therebetween; the lens support 20, the coil 30 and the magnet component 40 all are positioned in the accommodating; and the housing 10 and the pedestal 70 are assembled together via an embedment structure. The pedestal 70 is configured to support the lens support 20, the coil 30 and the magnet component 40, and under the joint action of the pedestal 70 and the housing 10, provides the accommodating for the lens support 20, the coil 30 and the magnet component 40; furthermore, it can take the effect of protecting internal components. In addition, the housing 10 and the pedestal 70 are assembled together via the embedment structure, so the structure is simple, the operation is convenient, the assembly effect is good and the reliability and the stability are strong.

Figure 4:
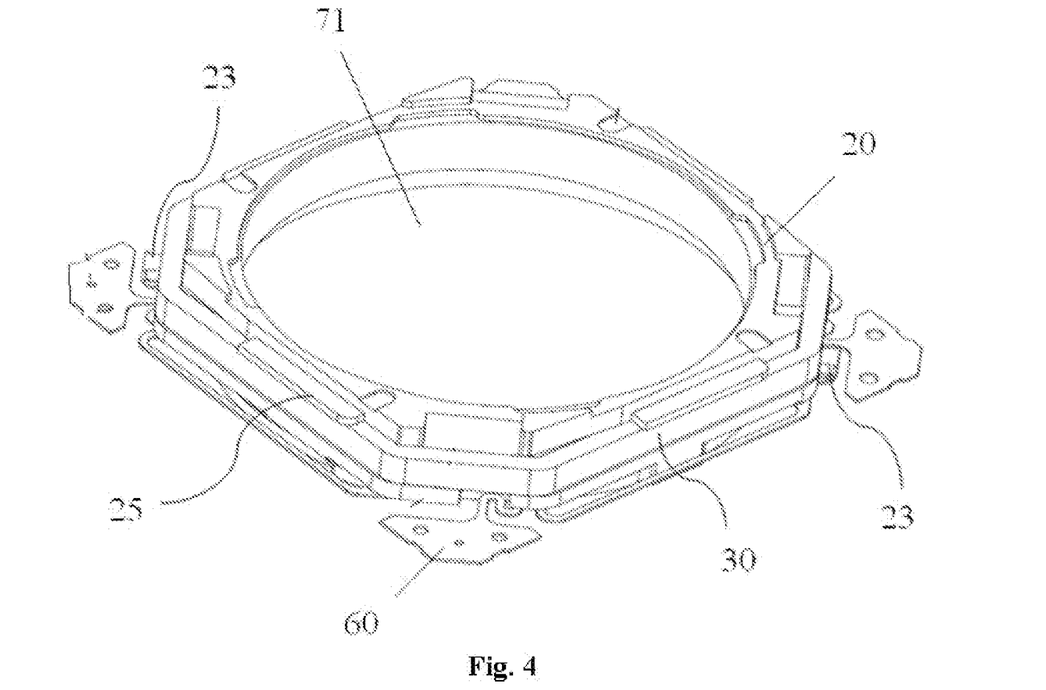
FIG. 4 is a schematic diagram of a connection relationship among a lower spring, a coil and a lens support in the present embodiment.

In specific embodiments shown in FIG. 4 and FIG. 5, the pedestal 70 is provided with a central avoidance opening 71 and a dustproof ring 72; and the dustproof ring 72 extends along the circumferential direction of the central avoidance opening 71. The lens support 20 is provided with a holding cavity. The dustproof ring 72 stretches into the holding cavity of the lens support 20 and is combined with the holding cavity in a noncontact staggered manner, so that very good dustproof effect can be taken.

As shown in FIG. 5 and FIG. 6, the embedment structure includes a plurality of gap portions and a plurality of projection portions 82; the gap portions are arranged on the housing 10; and the projection portions 82 are arranged at a outer periphery of the pedestal 70 and can be embedded into the gap portions. The projection portions 82 and the gap portions 81 both are simply structured, can meet the requirement on the embedment and have good assembly effect and strong reliability and stability.

In an exemplary embodiment, the gap portions are positioned at the vortex angles of the housing 10. In this way, the adverse effect to other components may be avoided, and the use performance of the lens drive motor is improved.

In the present embodiment, multiple positioning posts are provided on a lower end surface of the lens support 20; the lower spring 60 is provided with multiple positioning holes 61; and the multiple positioning posts are cooperatively arranged with the multiple positioning holes 61. The lens support 20 and the lower spring 60 are cooperatively connected via the positioning posts and the positioning holes 61, so that the reliability of the assembly is increased and simultaneously the convenience in assembly may be improved.

It is to be noted that, according to different structures of the motor, the configuration number of the sub-magnets in the bent type structure may be adjusted to achieve the optimal driving effect.

It is to be noted that, when the magnet component 40 and the housing 10 are attached, the compactness of the lens drive motor can be increased and the size of the lens drive motor is reduced; and when a gap is provided between the magnet component 40 and the housing 10, the glue is conveniently injected into the gap for adhering and fixing and thus the adhesiveness between the magnet component 40 and the housing 10 can be increased.

Figure 7:
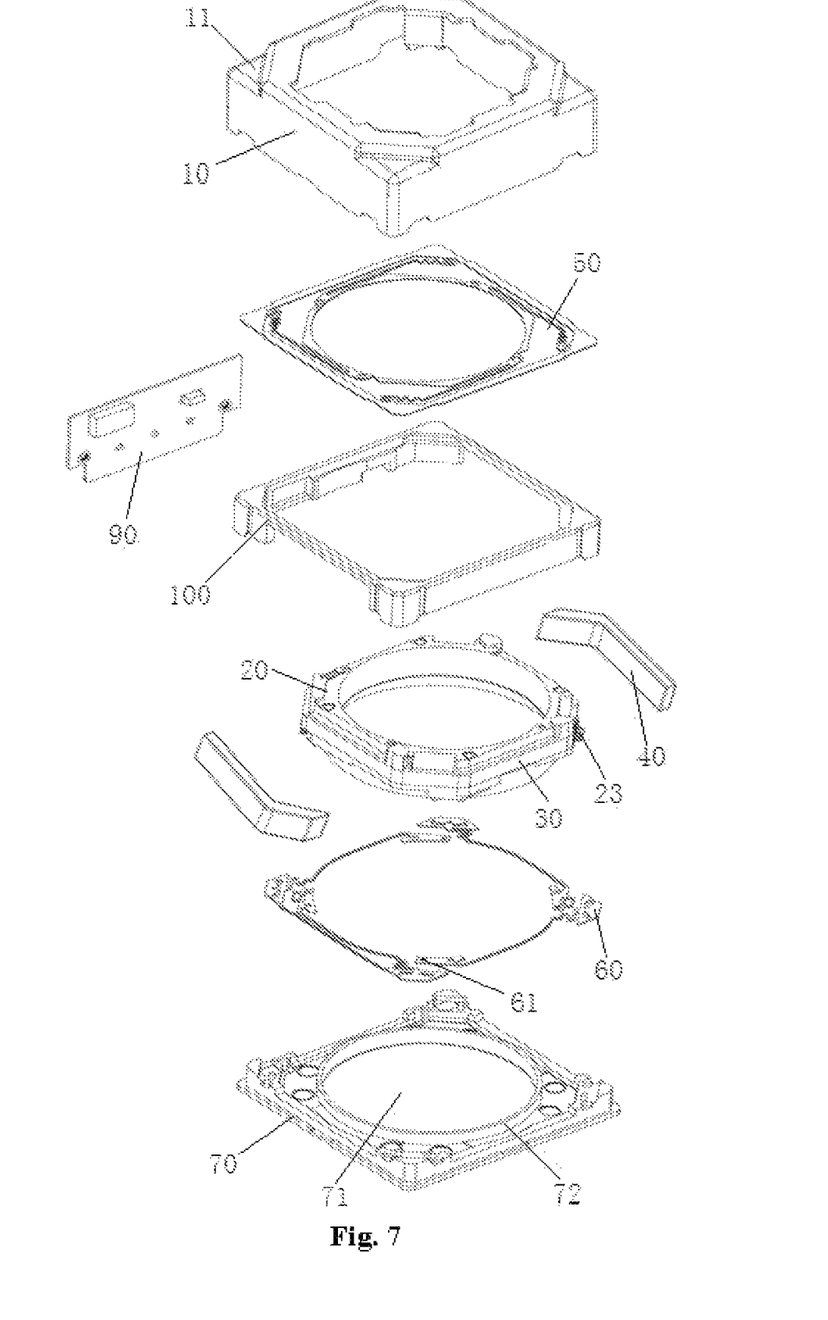
FIG. 7 is an exploded view of a lens drive motor in the present embodiment.

The present embodiment is a closed-loop motor. In the structure of the closed-loop motor, through enabling a hall chip 100 of a PCB 90 to induct with a hall magnet embedded onto the lens support 20 and through magnetic field intensity generated during a charging action process of the motor, a current position where the lens is located can be calculated and detected. By applying a given current to the motor, the quick and accurate focusing purpose may be achieved. The above is implemented by a position feedback system of the closed-loop motor, which is the function distinguished from the conventional motor. When the top of the housing 10 is made of the SUS material, the adverse condition of interference due to the hall magnet can be effectively prevented and thus the induction between the hall chip 100 and the hall magnet reaches to the best optimal state. The sides of the housing 10 are made of the SPCC material, which is intended to effectively reduce the flux leakage phenomenon of the magnet component 40 and increase the magnetic field intensity with the coil 30, thus improving the thrust of the motor. Therefore, the housing 10 is made using a combined manner of the SPCC material and the SUS material, so that the performance of the motor may be enhanced and a problem of poor stroke of the motor due to insufficient thrust of the motor can be improved.

In general, the whole housing of the closed-loop motor is made of the SUS material. According to the present embodiment, the material SUS of which the sides of the housing 10 are made generally is replaced into the SPCC material to obtain the optimal driving force.

It is to be noted that, the material of the housing 10 in the present embodiment is not limited to the combined form of the SPCC material and the SUS material. As long as the performance implemented by the combination of the SPCC material and the SUS material can be met, materials having a positive effect to resist the flux leakage all can be selected to manufacture the housing 10 of the present embodiment.

In addition, the housing 10 in the combined form of the SPCC material and the SUS material not only is applied to the application of the closed-loop motor, but also may be applied to an OIS type of motor or other types of VCM motors.

From the above descriptions, it may be seen that the above-mentioned embodiment of the present embodiment achieves the following technical effects.

1. The portion, corresponding to the magnet component, of the housing is made of the SPCC material, the other portions of the housing are made of the SUS material, and a magnetic conductivity of the SUS material is smaller than that of the SPCC material, so on the premise of guaranteeing the magnetic field intensity, the compressive strength of the lens drive motor is increased and the very good protective effect is taken on the lens drive motor.

2. Since the magnetic field intensity is effectively improved, a magnetic field component may be designed to be lighter and thinner, and thus a higher and thinner lens drive motor can be designed and the aesthetics is improved.

3. Since the magnetic field intensity is increased, a relatively large driving force can be generated even under the action of a very small current and the energy consumption is reduced.

4. The structure is simple and the assembly is easy.

Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It is to be noted that, terms used herein are used to merely describe specific embodiments and should not be construed as limiting the present disclosure. As used herein, unless the context clearly indicates otherwise, singular expressions should be interpreted to include plural expressions. In addition, it should be further understood that, the terms "include" and/or "comprise" in the specification may represent the existence of a feature, a step, an operation, a component, a part and/or the combination thereof.

It should be noted that, terminologies such as "first" and "second" in the specification, claims and accompanying drawings of the present disclosure are only used to distinguish similar objects, rather than to describe a special order or a precedence order. It should be understood that data used in such a way may be interchangeable in a certain cases, such that the embodiments of the present disclosure described here can be implemented in an order other than those illustrated or described here.

The above are only preferred embodiments of the present disclosure rather than limits to the present disclosure. To a person skilled in the art, the present disclosure may have various variations and changes. Any modification, equivalent replacement, improvement and the like made within the spirit and principle of the present disclosure should include in a scope of protection of the present disclosure.

What is claimed is:

1. A lens drive motor, wherein the lens drive motor comprises: a housing, a lens support, a coil and a magnet component, the coil being wrapped around the lens support and being provided in the housing, the magnet component being provided between the housing and the lens support, wherein a portion, corresponding to the magnet component, of the housing is made of a first material, and other portions of the housing are made of a second material; and a magnetic conductivity of the second material is smaller than a magnetic conductivity of the first material; multiple straight edge segments and multiple corner segments connecting the multiple straight edge segments are comprised at a outer periphery of the lens support; at least one of the multiple corner segments is provided with a wrapping post; the magnet component is provided in avoidance of the wrapping post; and end portions of the coil are fixed on the wrapping post.

2. The lens drive motor as claimed in claim 1, wherein the first material and the second material are fixed by welding.

3. The lens drive motor as claimed in claim 1, wherein
the first material is a Steel Plate Cold rolled Commercial (SPCC) material; and/or
the second material is a Steel Use Stainless (SUS) material.

4. The lens drive motor as claimed in claim 1, wherein a portion, corresponding to the magnet component, of a peripheral wall of the housing is made of the first material.

5. The lens drive motor as claimed in claim 1, wherein the magnet component comprises multiple sub-magnets provided in pairs; and two sub-magnets of each pair of the multiple sub-magnets are respectively positioned at two sides of the lens support and are at least corresponding to straight edges of the housing.

6. The lens drive motor as claimed in claim 5, wherein
each of the multiple sub-magnets is of a bent type structure; each of the multiple sub-magnets comprises a main body segment and an extending segment connected sequentially; an included angle is formed between the extending segment and the main body segment;

multiple straight edge segments and multiple corner segments connecting the multiple straight edge segments are comprised at a outer periphery of the lens support; the main body segment cover corresponding one straight edge segment of the multiple straight edge segments; and the extending segment stretch out to one of the corner segments.

7. The lens drive motor as claimed in claim 1, wherein the multiple corner segments are four corner segments, and there are two wrapping posts; and the two wrapping posts are respectively provided on two corner segments symmetrical to each other.

8. The lens drive motor as claimed in claim 1, wherein the lens support is provided with a wire wrapping area; a plurality of limiting ridges for stopping the coil are provided in the wire wrapping area; a plurality of anti-impact ridges are further provided in the wire wrapping area; and the coil is wrapped in the wire wrapping area to cover the anti-impact ridges.

9. The lens drive motor as claimed in claim 1, wherein a thickness H1 of a corner portion of a peripheral wall of the housing is greater than a thickness H2 of other portions of the peripheral wall of the housing.

10. The lens drive motor as claimed in claim 9, wherein a ratio of the thickness H2 to the thickness H1 is greater than 0.6 and is less than 1.

11. The lens drive motor as claimed in claim 9, wherein the thickness H1 is greater than or equal to 0.2 mm and is smaller than or equal to 0.25 mm.

12. The lens drive motor as claimed in claim 11, wherein the thickness H1 is equal to 0.2 mm.

13. The lens drive motor as claimed in claim 9, wherein the thickness H2 is greater than or equal to 0.15 mm and is smaller than or equal to 0.2 mm.

14. The lens drive motor as claimed in claim 13, wherein the thickness H1 is equal to 0.15 mm.

15. A camera, wherein the camera comprises the lens drive motor as claimed in claim 1.

16. A mobile terminal apparatus, wherein the mobile terminal apparatus comprises the camera as claimed in claim 15.

17. The mobile terminal apparatus as claim in claim 16, wherein the mobile terminal apparatus comprises at least one of a mobile phone, an information carrying terminal and a notebook computer.

* * * * *